Jan. 6, 1925.
F. MÄDLER
1,521,694
METHOD AND MEANS FOR CONTROLLING THE OPERATION OF
TWO-STROKE INTERNAL COMBUSTION ENGINES
Filed Aug. 29, 1921
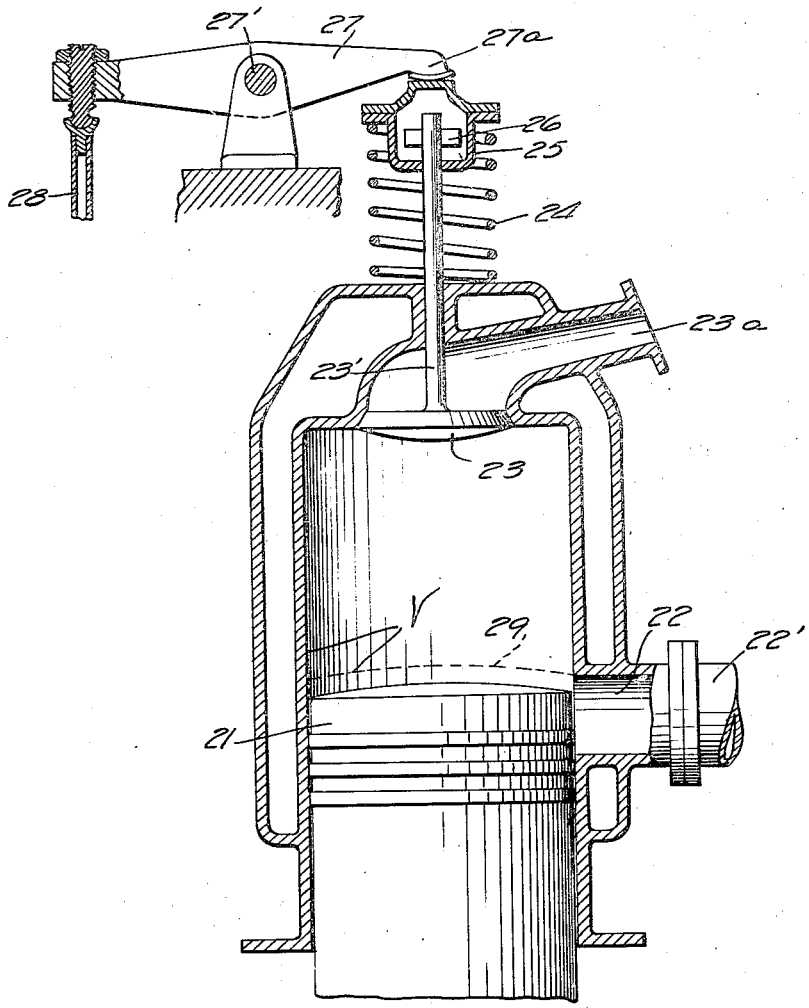
INVENTOR
Franz Mädler
BY
Adolph A. Thomas
ATTORNEY Patented Jan. 6, 1925.

1,521,694

UNITED STATES PATENT OFFICE.

FRANZ MÄDLER, OF CHARLOTTENBURG, NEAR BERLIN, GERMANY, ASSIGNOR TO MAEDLER ENGINE CORPORATION, OF CLEVELAND, OHIO, A CORPORATION OF MARYLAND.

METHOD AND MEANS FOR CONTROLLING THE OPERATION OF TWO-STROKE INTERNAL-COMBUSTION ENGINES.

Application filed August 29, 1921. Serial No. 496,425.

*To all whom it may concern:*

Be it known that I, FRANZ MÄDLER, a citizen of Germany, residing at Charlottenburg, near Berlin, Germany, have invented certain new and useful Improvements in Methods and Means for Controlling the Operation of Two-Stroke Internal-Combustion Engines, of which the following is a specification, and for which applications have been filed in Germany on September 12, 1919, March 5, 1920, and April 12, 1920, and on dates later than September 12, 1919, in each of the following countries: Austria, Hungary, Czechoslovakia, Poland, Switzerland, France, Belgium, Italy, Spain, Canada, Japan, Denmark, Sweden, Norway, Holland, and England.

My invention relates to internal combustion engines and more particularly to a method of controlling and increasing the efficiency of two-stroke internal combustion engines. It is an object of my invention to utilize the kinetic energy of the exhaust gases for scavenging and recharging the cylinders with air and fuel.

The complete scavenging of the cylinder and the subsequent recharging by means of the exhaust gases is based on the supposition that the said gases will invariably begin to exhaust with a certain minimum pressure. Now in accordance with my present invention it is intended that the engine shall always be so regulated that the pressure of the combustion gases in the working cylinder at the moment when the exhaust ports or passages are opened shall be sufficient to expel the exhaust gases almost instantaneously until approximately atmospheric pressure exists in the cylinder. The continued movement of the exhaust gases due to their kinetic energy practically clears the cylinder of the remaining exhaust gases and recharges the cylinder. Such a regulation may be effected in two ways: on the one hand, by simply altering the time of ignition (provided it be intended to merely regulate the speed of the engine), by which means the maximum explosion pressure may be varied within wide limits, while the final pressure in the working cylinder at the time when the exhaust port opens will remain approximately constant within certain limits. But if, on the other hand, the control is effected by an alteration of the volume of the power charge in the working cylinder (provided it be intended to regulate the load and the speed of the engine), then the explosive pressure will vary according to the volume of the explosive mixture in the working cylinder, and therefore the pressure at the moment when the exhaust ports begin to open will likewise vary. The explosive mixture fired in the working cylinder must be of sufficient volume and pressure so that the pressure in the cylinder, when the exhaust ports begin to open, is such that it expels the exhaust gases almost instantaneously until approximately atmospheric pressure exists in the cylinder. As previously stated, the continued movement of the exhaust gases, due to their kinetic energy, practically clears the cylinder of the remaining exhaust gases and recharges the cylinder.

Now, this second method of regulation is best effected, in accordance with my invention, by varying the volume of the power charge in combination with varying the time of ignition. This regulation must be such that the pressure in the cylinder when the exhaust gases are freely rushing out will not fall below the degree required for the scavenging and recharging of the cylinder. In other words, this pressure must be such that, when the exhaust gases are released from the cylinder, they are energized sufficiently to scavenge and recharge the cylinder. In practice, this pressure of the combustion gases must be more than two atmospheres, as will fully appear later on.

Since the exhaust gases are expelled almost instantaneously, the scavenging and recharging of the cylinder must necessarily be carried out in the same instantaneous period, and to accomplish this the admission valve must be opened at the very moment when a pressure equal to or below that in the inlet pipe of the admission valve is created in the cylinder.

When the volume and pressure of the charge in the cylinder are varied, the pressure in the cylinder at the moment when the exhaust ports open will also vary, and this means that the escaping exhaust gases will have varying velocities. For this reason, care must be taken that the admission valve is so designed and regulated that it will always open under these varying conditions at the moment when the pressure in the cylinder drops down to or below the pressure in the inlet pipe of the admission valve.

According to my invention, this novel object is achieved by means of a valve so constructed and arranged that it will open automatically at the instant when the pressure in the cylinder is approximately equal to or below the pressure in the admission pipe, regardless of the velocities of the escaping exhaust gases. When the admission valve is thus opened, the kinetic energy of the escaping exhaust gases draws scavenging air through the cylinder to expel the remaining exhaust gases and to recharge the cylinder with fresh air.

Referring more particularly to the admission valve, in the preferred construction I employ means for normally holding the valve positively against its seat and automatically releasing the valve-holding means during the compression and explosion stroke of the main piston. During this period the pressure prevailing in the cylinder keeps the valve shut. As soon as the exhaust gases rush out of the cylinder through the exhaust port into the exhaust pipe and the pressure in the cylinder becomes equal to or lower than the pressure in the admission pipe, the admission valve, now no longer positively retained by the holding means, opens quickly to admit the scavenging air and recharging of the cylinder. This valve is so constructed and arranged that, while it opens automatically, it is closed by positive means at a predetermined time on the compression stroke of the piston.

In the drawing forming part of this specification, I have indicated diagrammatically, by way of example, a construction by means of which my new method may be carried out in practice.

The engine is here illustrated in the position assumed when the piston 21, in moving downward on the power stroke, has slightly opened the exhaust passage or port 22, and the exhaust gases have started to rush out through exhaust pipe 22', which is illustrated as broken off for lack of space. The admission valve 23 is held positively closed by a spring 24 arranged between the cylinder head and a collar 25 against which the upper end of the spring presses. The upper end of the valve stem 23' extends through a hole in the collar 25 and carries a connecting piece in the form of a key 26. Normally, the spring 24 bears against the collar 25 and this collar engages the key 26 to transmit the upward pressure of the spring to the valve, thereby positively closing the same. For the automatic opening of the valve, the operative connection between the spring 24 and the valve is broken or rendered ineffective by depressing the collar 25 clear of the key 26. This may be accomplished by any practical means. In the drawing by way of example, I have shown a lever 27 pivoted at 27' and operated by a rod 28, which is suitably actuated to rock the lever 27 at predetermined intervals. As previously stated, the spring 24 normally holds the valve 23 closed. When the end 27ª of lever 27 is depressed, the operative connection between the spring and the valve is broken, so that the valve is held closed merely by the pressure in the cylinder. This is the position illustrated in the drawing. The instant when the pressure in the cylinder drops to or below that in the admission pipe 23ª, the valve automatically opens. The downward movement of the valve is limited in this particular instance by the key 26 striking the collar 25.

While the admission valve 23 is open, the remaining exhaust gases in the cylinder are quickly drawn out by the kinetic energy of the exhaust gases passing through the exhaust pipe 22', and scavenging air passes through the cylinder until the piston 21 closes the exhaust port 22 on its compression stroke. The admission valve 23 is closed during the upward or compression stroke of the piston at a predetermined moment, and this is effected (in the arrangement shown) by a downward movement of the rod 28, which throws the end 27ª of lever 27 up and thus allows the spring 24 to push the collar 25 against the key 26. This positively closes the valve 23. The timing of the positive closing of the admission valve 23 is regulated by controlling the operation of the rod 28. It will be clearly seen that by regulating the moment of closing of valve 23 after the exhaust port 22 is closed, the volume of air charge enclosed in the cylinder is regulated accordingly. The rod 28 is intended to represent any practical means for controlling the operation of the lever 27, and therefore, of the valve 23.

It will be understood, of course, that at the proper moment a predetermined fuel charge is admitted into the air charge of the cylinder to form the explosive mixture therewith. I have not deemed it necessary to show or describe any particular form of fuel-injecting means, since any practical fuel-injecting device may be employed. For instance, I may use any one of the fuel-injecting means set forth in my co-pending application, Serial Number 396,870, filed July 16, 1920, or the fuel pump disclosed in my co-pending application, Ser. No. 556,746, filed April 26, 1922.

In carrying out the method of my invention by an apparatus like that diagrammatically indicated in the drawing, the closing of valve 23 should be so regulated that the volume of charge in the cylinder will produce combustion gases of such a pressure during the power stroke that, when the exhaust port 22 opens, this pressure expels the exhaust gases almost instantaneously until approximately atmospheric pressure exists in the cylinder. As the expelled exhaust gases pass through the exhaust pipe 22' at high velocity, they cause scavenging air to enter through the open valve 23 and thus practically clear the cylinder of the remaining exhaust gases. Immediately after the cylinder has thus been scavenged through the kinetic energy of the exhaust gases, the continued rush of gases through the exhaust pipe 22' brings a fresh air charge into the cylinder through valve 23. Thereupon, the exhaust port 22 is closed as the piston 21 moves inward (or up, as viewed in the drawing), and the valve 23 is closed at the desired moment, as hereinbefore described.

I have stated before that the pressure in the cylinder at the time of exhaust must be sufficient to scavenge and recharge the cylinder. To be more specific, the degree or amount of this pressure may be expressed in "units of atmospheric pressure" or in "units of volume and pressure". For example, referring to the drawing, let the dotted line 29 indicate the position of the piston 21 when the exhaust port 22 is just closed. Then let V represent the maximum volume of gases that can be enclosed in the cylinder at atmospheric pressure. Briefly, we may call V the cylinder volume at atmospheric pressure. Now, let us assume that the exhaust gases at volume V are under a pressure of more than two atmospheres. It is clear that when the exhaust port 22 opens, these gases will expand to more than twice the volume V at atmospheric pressure. Therefore, the exhaust gases will rush out of the cylinder until there remains in the cylinder one volume V of exhaust gases at approximately atmospheric pressure. But, due to the kinetic energy of the gas masses moving through the exhaust pipe, the volume of exhaust gas in the cylinder is swept out, and this tends to produce an under-pressure in the cylinder. As the valve 23 is at this time open, as before described, and as the scavenging air in pipe 23ª is at or above atmospheric pressure, the sweeping out of practically the last exhaust gases from the cylinder is immediately followed by an inrush of scavenging air through the valve 23.

It will be clear that the number of volumes V of air carried through the cylinder before the exhaust port 22 is closed by the piston 21 on its upward stroke and the cylinder recharged with air, is in direct proportion to the pressure of the exhaust gases at the moment of exhaust. For instance, let us say that we have so operated our engine that the pressure of the exhaust gases in the cylinder at the moment when the exhaust port 22 opens is five atmospheres, which is approximately 75 pounds per square inch. This means that we have approximately 5V volumes of exhaust gases at atmospheric pressure compressed into one volume V in the cylinder at a pressure of five atmospheres. Now, when the exhaust port is opened, four volumes V of exhaust gases rush through the exhaust pipe 22' and one volume V tends to remain in the cylinder at atmospheric pressure. However, the kinetic energy of the gases moving at high velocity through pipe 22' causes four volumes of air to be drawn through the cylinder. One volume of this scavenging air replaces the remaining volume of exhaust gases, and three volumes of air sweep through the cylinder and exhaust port to complete the scavenging. This naturally leaves at the time the exhaust port closes, one volume V of fresh air charge in the cylinder at approximately atmospheric pressure.

So it will be understood that the minimum pressure of the exhaust gases at the moment when the exhaust port opens must be in excess of two atmospheres to scavenge and recharge the cylinder. When I speak of exhaust gases, I do not intend to refer only to gases in the exhaust pipe, but I mean generally combustion gases after the maximum explosive pressure has been reached in the cylinder and by their expansion move the piston outwardly. Now, in accordance with my invention, the kinetic energy of the expanding combustion gases not only operates the piston on its power stroke, but a proportion of the expansive force of these gases is utilized to scavenge and recharge the cylinder. In other words, in the method and apparatus of my invention, a portion of the kinetic energy of the combustion gases is utilized to scavenge and recharge the working cylinder.

It goes without saying, of course, that the admission valve 23, exhaust port 22, and exhaust pipe 22', must be of proper area and design.

Although I have herein diagrammatically illustrated certain apparatus embodying the means and methods of my invention, I want it understood that this apparatus is merely illustrative of one of several ways and means for carrying out in practice the principles of my invention.

I claim—

1. A method of controlling two-stroke internal combustion engines, which comprises controlling the time of closing of a scavenging valve of the cylinder to regulate the volume of power charge compressed in the cylinder so that the pressure of the gases in the cylinder at the time when the exhaust port opens is such that the kinetic energy of the exhaust gases as they rush through the exhaust pipe is utilized to scavenge and recharge the cylinder.

2. A method of controlling two-stroke internal combustion engines, which comprises controlling the operation of the admission valve to the cylinder in such a way that the valve is closed to regulate the volume of power charge compressed in the cylinder and the valve is automatically opened the moment when the pressure in the cylinder is less than the pressure in the admission pipe, said volume of power charge being so regulated that the pressure of the exhaust gases in the cylinder at the time when the exhaust port opens is such that the kinetic energy of the exhaust gases causes scavenging air to follow these gases as they rush out of the cylinder through the exhaust pipe at high velocity and also causes a fresh charge to be brought into the cylinder through the open admission valve.

3. In a two-stroke internal combustion engine, a working cylinder provided with a scavenging valve and an exhaust port, a piston in said cylinder, an admission pipe for said valve, an exhaust pipe for said exhaust port, means for mechanically closing said valve, means for controlling the time of closing of said valve to regulate the volume of power charge compressed in the cylinder, so that the pressure of the gases in the cylinder at the time when the exhaust port opens is such that the kinetic energy of the exhaust gases as they rush through the exhaust pipe is utilized to scavenge and recharge the cylinder, and means whereby said valve opens automatically when the pressure in the cylinder is less than the pressure in the admission pipe.

4. In a two-stroke internal combustion engine, a cylinder provided with an admission valve and an exhaust port, a piston in said cylinder, an admission pipe for said admission valve, an exhaust pipe for said exhaust port, positively actuated means for closing said admission valve at a predetermined moment during the compression stroke of the piston, and means whereby said valve automatically opens when the pressure in the cylinder is lower than the pressure in said admission pipe during the exhaust stroke of the piston.

5. In a two-stroke internal combustion engine, a cylinder provided with an admission valve and an exhaust port, a piston in said cylinder, an admission pipe for said valve, an exhaust pipe for said exhaust port, positively actuated means for closing said admission valve at a predetermined moment during the compression stroke of the piston, means whereby said valve automatically opens when the pressure in the cylinder is lower than the pressure in said admission pipe during the exhaust stroke of the piston, and means for controlling the operation of said valve-closing means to vary the moment of closing of said admission valve.

6. In a two-stroke internal combustion engine, a cylinder provided with an admission valve and an exhaust port, a piston in said cylinder, an admission pipe for said admission valve, an exhaust pipe for said exhaust port, a spring for positively closing said valve at a predetermined moment during the compression stroke of the piston, and means for breaking the operative connection between said spring and said valve to permit automatic opening of said valve when the pressures in the cylinder and in said admission pipe are approximately equalized on the exhaust stroke of the piston, said means being also operable to restore said operative connection and cause said spring to close the valve.

7. In a two-stroke internal combustion engine, a cylinder provided with an admission valve and an exhaust port, a piston in said cylinder, an admission pipe for said admission valve, an exhaust pipe for said exhaust port, a spring for positively closing said valve at a predetermined moment during the compression stroke of the piston, means for breaking the operation connection between said spring and said valve to permit automatic opening of said valve when the pressures in the cylinder and in said admission pipe are approximately equalized on the exhaust stroke of the piston, said means being also operable to restore said operative connection and cause said spring to close the valve, and means for controlling the restoring operation of said last-mentioned means to vary the moment of closing of said valve.

8. In a two-stroke internal combustion engine, a cylinder provided with an admission valve and an exhaust port, a piston in said cylinder, a spring normally tending to keep said valve closed, and controlling means for discontinuing the action of the spring on the valve before the pressure in the cylinder falls to atmospheric during the exhaust stroke of the piston and for restoring the action of said spring on the valve to close the latter during the compression stroke of the piston.

9. A method of controlling two-stroke internal combustion engines, which comprises controlling the time of closing of the admission valve of the cylinder to so regulate the volume of power charge compressed in the cylinder that the pressure of the combustion gases in the cylinder at the time when the exhaust port opens is such that the unexpended portion of the kinetic energy of the combustion gases is utilized to scavenge and recharge the cylinder.

10. In a two-stroke internal combustion engine, a cylinder provided with an admission valve and an exhaust port, a piston in said cylinder, and properly timed mechanism for controlling the time of closing of said valve to so regulate the volume of power charge compressed in the cylinder that the pressure of the combustion gases in the cylinder at the time when the exhaust port opens is such that the unexpended portion of the kinetic energy of the combustion gases is utilized to scavenge and recharge the cylinder.

11. In a two-stroke internal combustion engine having a working cylinder provided with a piston and an exhaust port, mechanism for determining the volume of power charge consumed in the cylinder so that the kinetic energy of the combustion gases in the cylinder is regulated in such a manner that such part of the kinetic energy of the combustion gases as is not utilized in operating the piston efficiently on its power stroke in utilized to help scavenge and recharge the cylinder.

In testimony whereof I affix my signature.

FRANZ MÄDLER.